Oct. 20, 1970 L. E. ZEGERS ET AL 3,535,448
TWO-CHANNEL TIME-MULTIPLEX TRANSMISSION SYSTEMS
Original Filed July 9, 1965
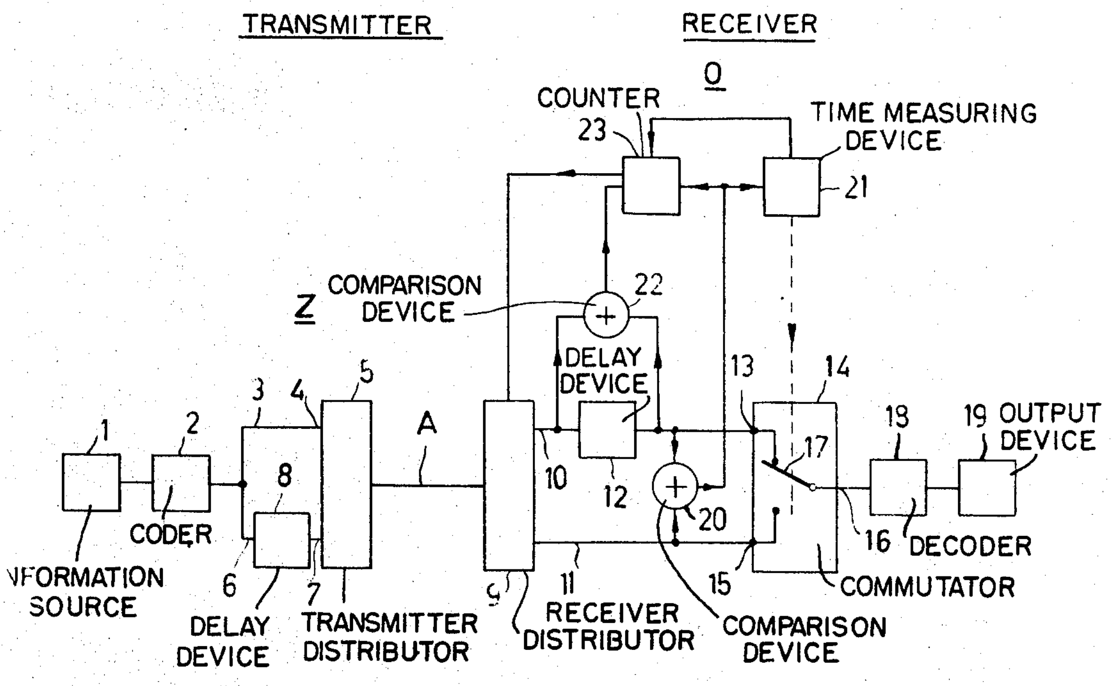
INVENTORS
LEO E. ZEGERS &
JAN KUILMAN
BY
[signature]
AGENT United States Patent Office 3,535,448
Patented Oct. 20, 1970

3,535,448

TWO-CHANNEL TIME-MULTIPLEX TRANSMISSION SYSTEMS

Leo Eduard Zegers and Jan Kuilman, Emmasingel, Eindhoven, Netherlands, assignors, by mesne assignments, to U.S. Philips Corporation, New York, N.Y., a corporation of Delaware Continuation of application Ser. No. 470,769, July 9, 1965. This application Mar. 5, 1969, Ser. No. 805,119
Claims priority, application Netherlands, July 11, 1964, 6407941
Int. Cl. H041 17/16
U.S. Cl. 178—23 3 Claims

ABSTRACT OF THE DISCLOSURE

A pulse code transmission system of the type in which pulses are transmitted by two channels, one of which has a delay, and the pulses are received by two channels. The receiving channel corresponding to the undelayed transmitting channel includes a delay device. The outputs of the two receiving channels are compared in a first comparison device in order to activate a time measuring device for commutating the outputs in the event an error is detected. The input and output of the receiving delay device are also compared in a second comparison device to operate a counter which, responsive to an output of the first comparison device, switches the inputs of the receiving channels.

This application is a continuation of Ser. No. 470,769 filed July 9, 1965, now abandoned.

The invention relates to a two-channel time-multiplex transmission system for the transmission of pulses from a transmitting device to a receiving device in which the same information is transmitted in the form of a pulse sequence through one channel and with a fixed time delay through the other channel, while the receiving device comprises a pulse delay device associated with one channel for delaying the pulse sequence transmitted through this channel with respect to the pulse sequence transmitted through the other channel.

Such a transmission system has previously been suggested for correcting error bursts caused by given kinds of interference phenomena, for which purpose use is made of a commutating device which normally connects a decoding device with the output of the pulse delay device and which connects the decoding device for a given period of time with the other channel a given lapse of time after the beginning of an interference. A system of this type is disclosed in copending U.S. patent application Ser. No. 437,181 filed Mar. 4, 1965.

In time multiplex systems, the problem generally occurs of supplying the pulses originating from the various transmitting channels to the correct receiving channels.

The invention has for its object to provide for the transmission system described in the preamble a method of early detecting channel interchanges, as a result of which it becomes possible to correct the errors resulting from these channel interchanges in the same manner as error bursts.

A transmission system in accordance with the invention is characterized in that for the detection of channel interchanges in the receiving device, use is made of a pulse comparison device which compares the input pulses of the pulse delay device with the output pulses thereof.

The invention will now be described more fully with reference to an embodiment of a transmission system according to the invention shown block schematically in the accompanying drawing.

The pulse transmission system for the transmission of pulse-coded information from a transmitting device Z to a receiving device O through a transmission path A shown in FIG. 1 serves to realize an error-free transmission of information in the presence of interference phenomena in the transmission path A which causes concentrated error (error bursts) in the transmitted pulse sequences. An information source 1, for example, a punched tape scanner, supplies information which is converted by a coding device 2 to a sequence of equidistant 0-pulses and 1-pulses. This pulse sequence is supplied to two different transmitting channels 3 and 6 of a two-channel time-interlacing transmission system. The transmitting channel 3 is directly connected to an input 4 of a transmitter distributor 5. The transmission channel 6 comprises a pulse delay device 8 which acts as a buffer storage device between the input side of the transmission channel 6 and the output side thereof which is connected to a second input 7 of the transmitter distributor 5. The transmitter distributor 5 pulse interlaces the pulse sequences of the transmission channels 3 and 6 in a manner usual for time-interlacing systems and supplies the interlaced pulse sequences to the transmission path A. On the receiving side of transmission path in the receiving device O, provision is made of two receiving channels 10 and 11. The pulse sequence of tranmission channel 3 is intended for the receiving channel 10 and the pulse sequence of the transmission channel 6 is intended for the receiving channel 11. The received pulse sequence is supplied to the input of a receiver distributor 9. The receiver distributor splits up pulsatorily the received pulse sequence into the original pulse sequences in a manner usual for time-interlacing systems and supplies each pulse sequence to the correct receiving channel.

The receiving channel 10 comprises a pulse delay device 12 which acts as a buffer storage device between the input side of the receiving channel and the output side thereof which is connected to an input 13 of a commutator device 14. The receiving channel 11 is directly connected to a second input 15 of the commutator device. The commutator device 14, which is represented by a change-over contact 17, has two positions. In the position shown, the input 13 is connected to the output 16 while in the other position the input 15 is connected to the output. A decoding device 18 is connected to this output, which device decodes the pulse sequence supplied to it through the commutator device and supplies the coded information to an information user 19, for example, a tape puncher.

The time delay devices 8 and 12, which are referred to hereinafter as transmitting buffer and receiving buffer, have the form, for example, of shift registers and cause a time delay equal to a full number of pulse periods so that the number of pulses in each buffer is equal to the number of pulse periods by which the pulse sequences are delayed. The delay times of the two buffers are identical. As a result, the pulse sequences transmitted by the coding device appear at the output sides of the receiving channels without a difference in time. In the absence of interferences, the two pulse sequences are identical. If an interference appears in the transmission path which introduces errors into the transmitted time-interlaced pulse sequences, a pulse comparison device 20 responds at the beginning of the interference and supplies a starting signal to a time measuring device 21. This time measuring device then performs a cycle in which it becomes insensitive to further signals of the pulse comparison device. Each cycle consists of two successive time intervals. The first time interval is approximately equal to the delay time of the receiving buffer and after the end of this interval, the time measuring device changes the change-over contact 17 to the other position. The second interval following the first time interval is equal to the delay time of the receiving buffer and during this time interval the change-over contact 17 is held in the other position, while after the end of this interval the change-over contact is changed back to the position shown. The change-over contact is held in this position until the time measuring device 21 is started again.

The pulse comparison device 20 compares each output pulse of the receiving buffer 12 with the pulse simultaneously supplied to the receiving channel 11. If the latter pulse is equal to the output pulse of the receiving buffer, the comparison device supplies a 0-pulse. If, however, the two pulses are not equal to each other as a result of the fact that the pulse supplied to the receiving channel 11 is received with the wrong value due to an interference, the comparison device supplies a 1-pulse which acts as a starting signal for the time measuring device. Errors concentrated in the first interval of the time measuring device are removed from the pulse sequence supplied to the decoding device 18 with the aid of the commutator device 14. At the beginning of the interference, the receiving buffer contains pulses which were received during an interference-free period preceding the interference. These pulses are conducted away to the decoding device during the first time interval. Subsequently, the change-over contact 17 is commutated and during the second interval the pulses originating from the receiving channel 11 are supplied to the decoding device. The pulse sequence supplied to the decoding device consequently does not contain errors if no transmission errors are caused during the second time interval. After the end of the second time interval, the receiving buffer no longer contains any errors and the transmission of pulses from the receiving buffer 12 to the decoding device 18 may be resumed. The first time interval is preferably by one or more pulse periods shorter than the delay time of the receiving buffer in order to take into account a possible delay in time between the initial instant of the interference and the instant at which the pulse comparison device 20 responds. This value of the first time interval provides a better guarantee that all the pulses conducted away from the receiving buffer to the decoding device during the first time interval, were received during an interference-free period.

In the manner described above, it is possible to correct for 100% transmission errors caused by given kinds of interference phenomena such as those appearing in telephone connections and to realize an error-free pulse transmission from the coding device to the decoding device.

For a satisfactory operation of the system described above, it is required that the receiver distributor supplies the pulse sequences transmitted through the transmission channels 3 and 6 to the correct receiving channels. In the present two-channel system, the receiver distributor has two potential phase positions with respect to the transmitter distributor, that is to say that the number of potential phase positions generally amounts to $n$ for an $n$-channel system. In one phase position of the receiver distributor, there is a correct phase relation between the transmission channels and the receiving channels, whereas in the other phase position, the receiving channels and the transmission channels are relatively interchanged. If the receiving channels 10 and 11 are interchanged, the pulse sequences appearing at the outputs thereof have different delay times during transmission. As a result of the difference in delay time, the two pulse sequences are no longer identical and the pulse comparison device 20 detects an error each time when an inequality is assessed between a pulse of one sequence and a pulse of the other sequence arriving at the same time. A channel interchange thus results in that transmission errors are detected in the receiving device. If the 0- and 1-pulses are substantially arbitrarily distributed in the pulse sequence transmitted by the coding device, the detected errors and non-errors are also distributed substantially arbitrarily. The distribution of the errors is substantially not influenced by the real transmission errors caused by interference phenomena.

If the quality of the transmission is poor, it is practically impossible to find the correct channel phase so that it is generally necessary to wait until the transmission conditions have improved. A phase finding process which only utilizes the output signal of the pulse comparison device 20 would then be effected in the following manner. As soon as an error is detected, a testing device becomes operative which tests the distribution of the detected transmission errors during a given lapse of time, for example in the order of a few seconds, if desired of a few minutes, and which responds when an arbitrary distribution is assessed and interchanges the receiving channels. Such a phase-finding process requires a comparatively great amount of time, however, during which period of time no informatiton can be transmitted. This comparatively long period of time is also due to the fact that transient channel interchanges may be imitated by interference phenomena so that a channel interchange can be distinguished from interferences only when the distribution of the errors is tested during a long period of time. If this phase-finding process is carried out, this implies that the detected errors are considered on first approximation as real transmission errors due to interference phenomena. This assumption does not include, however, all the causes of channel interchange such as a transient violent interference or an occasional defect of the apparatus. If a channel interchange is due to one of these phenomena, the detection of this channel interchange according to the afore-mentioned process requires an amount of time equal to that required for the detection of a channel interchange which is due to an interference phenomenon of long duration or to a fading phenomenon of long duration.

The present transmission system is particularly intended for the correction of concentrated errors and in principle offers the possibility of correcting errors which are due to a channel interchange, provided that the receiver distributor is adjusted again to the correct phase position before the end of the first time interval of the time measuring device 21. For in this case, it is of no importance whether the detected errors are real transmission errors or not, since the pulses supplied to the decoding device 18 are invariably received through the correct receiving channel. In order to utilize the possibilities provided by the error-correcting system, the receiving device comprises an additional pulse comparison device 22 and a counting device 23. The pulse comparison device 22 compares each input pulse of the receiving buffer with the pulse appearing simultaneously at the output thereof. When equality is assessed, the comparison device supplies a 0-pulse and when inequality is assessed, this comparison device supplies a 1-pulse. The sequence of output pulses of the pulse comparison device 22 is supplied to the counting device 23. After an error has been detected by the pulse comparison device 20, this counting device is actuated simultaneously with the time measuring device 21 and then counts the number of 0-pulses in the pulse sequence of the pulse comparison device 22. The counting device 23 is stopped by the time measuring device 21 one or more pulse periods before the end of the first time interval. If the number of counted 0-pulses exceeds a given minimum value, the counting device supplies a correction pulse to the receiver distributor which changes the receiver distributor in a usual manner over from one phase position to the other phase position.

After a channel interchange, the receiving buffer supplies during its delay time a pulse sequence to the output which has the same delay time with respect to the coding device as the pulse sequence supplied to the input of the receiving buffer. If the position which may be attained by the counting device 23 in case of complete equality of the two sequences is assumed to be 100%, any other position which is in fact attained by the counting device expresses in a percentage the degree of correspondence between the two pulse sequences. If it is found that the degree of correspondence exceeds 80%, a channel interchange is very likely to have taken place and a correction pulse is supplied to the receiver distributor. In this manner, the correct channel phase is restored at the instant at which the change-over contact 17 is changed over to the position not shown and at which the pulses received through the receiving channel 11 in the correct phase are supplied to the decoding device 18. If the degree of correspondence between the two pulse sequences does not exceed approximately 50%, the counting device 23 does not take a correction measure, but if required, the afore-mentioned phase-finding process of long duration is carried out.

The method described has the advantage that many channel interchanges are detected early so that they can be corrected at an early stage, as a result of which a full correction of the errors due to these channel interchanges can be obtained.

What is claimed is:

1. A pulse transmission system comprising a transmitter and a receiver, said transmitter comprising a source of pulses to be transmitted, first and second transmitter channels, means applying said pulses to said first and second transmitter channels, said second transmitter channel comprising first delay means, and means for transmitting the outputs of said first and second transmitter channels over a common transmission path, said receiver comprising first and second receiver channels, output circuit means, means for selectively connecting one of said receiving channels to said output circuit means, distributing means connected to said transmission path for separating the signals of said transmitter channels and selectively applying said separated signals to said first and second receiver channels, said first receiver channel comprising second delay means, means responsive to an inequality of signal outputs of said first and second receiver channels for providing, a control signal, and means responsive to said control signal for counting the number of equalities in pulses at the input and output of said second delay means during a predetermined time period subsequent the occurrence of said control signal, said distributing means comprising, means responsive to the detection of at least a predetermined number of said equalities counted by said counting means for interchanging the signals applied to said first and second receiver channels.

2. A pulse transmission system comprising a transmitter and a receiver, said transmitter comprising a source of pulses to be transmitted, first and second transmitter channels, means for applying said pulses to said transmitter channels, one of said transmitter channels having first delay means for delaying said pulses for a predetermined time, and means for transmitting the outputs of said transmitter channels over a common transmission path, said receiver comprising first and second receiver channels, distributing means connected to said transmission path for separating the signals from said transmission path and selectively applying said separated signals to said receiver channels whereby undelayed signals from said first transmitter channel are applied to one of said receiver channels and delayed signals from said second transmitter channel are applied to the other of said receiver channels, one of said receiver channels having second delay means for delaying signals for said predetermined time, output means, means for selectively connecting the outputs of said first and second receiver channels to said output means, means for providing a control pulse responsive to the occurrence of dissimilar outputs from said first and second receiver channels, and means responsive to the occurrence of said control pulse for counting the number of similar pulses at the input and output of said second delay means occurring during a predetermined period following said control pulse and for providing a control signal when the number of said similar pulses exceeds a predetermined number, said distributor means comprising means responsive to said control signal for interchanging inputs of said first and second receiver channels.

3. A pulse transmission system comprising a transmitter and a receiver, said transmitter comprising means for applying first and second substantially identical pulse signals to a common transmission path, said second signal being delayed with respect to said first signal, said receiver comprising first and second channels, means for applying said first pulse signals to one of said channels and said second pulse signals to the other of said channels, output means, means for selectively connecting said channels to said output means, said first channel comprising delay means for delaying signals applied thereto for a time substantially equal to the delay between said first and second signals, first pulse comparing means connected to compare the pulse input and pulse output of said delay means, second pulse comparing means for comparing the pulse outputs of said first and second channels, and means responsive to a detection of unequal pulses by said second pulse comparing means followed by the detection of at least a predetermined number of similar pulses during a predetermined period by said first pulse comparing means for interchanging the inputs of said first and second channels.

References Cited

UNITED STATES PATENTS

| | | |
|---|---|---|
| 2,856,457 | 10/1958 | Prior. |
| 2,961,489 | 11/1960 | Carver. |
| 3,182,127 | 5/1965 | Wiese. |

THOMAS B. HABECKER, Primary Examiner

U.S. Cl. X.R.

178—69